Jan. 19, 1954  F. L. O. ROEHRIG  2,666,374
DUAL CAMERA
Filed Jan. 10, 1951
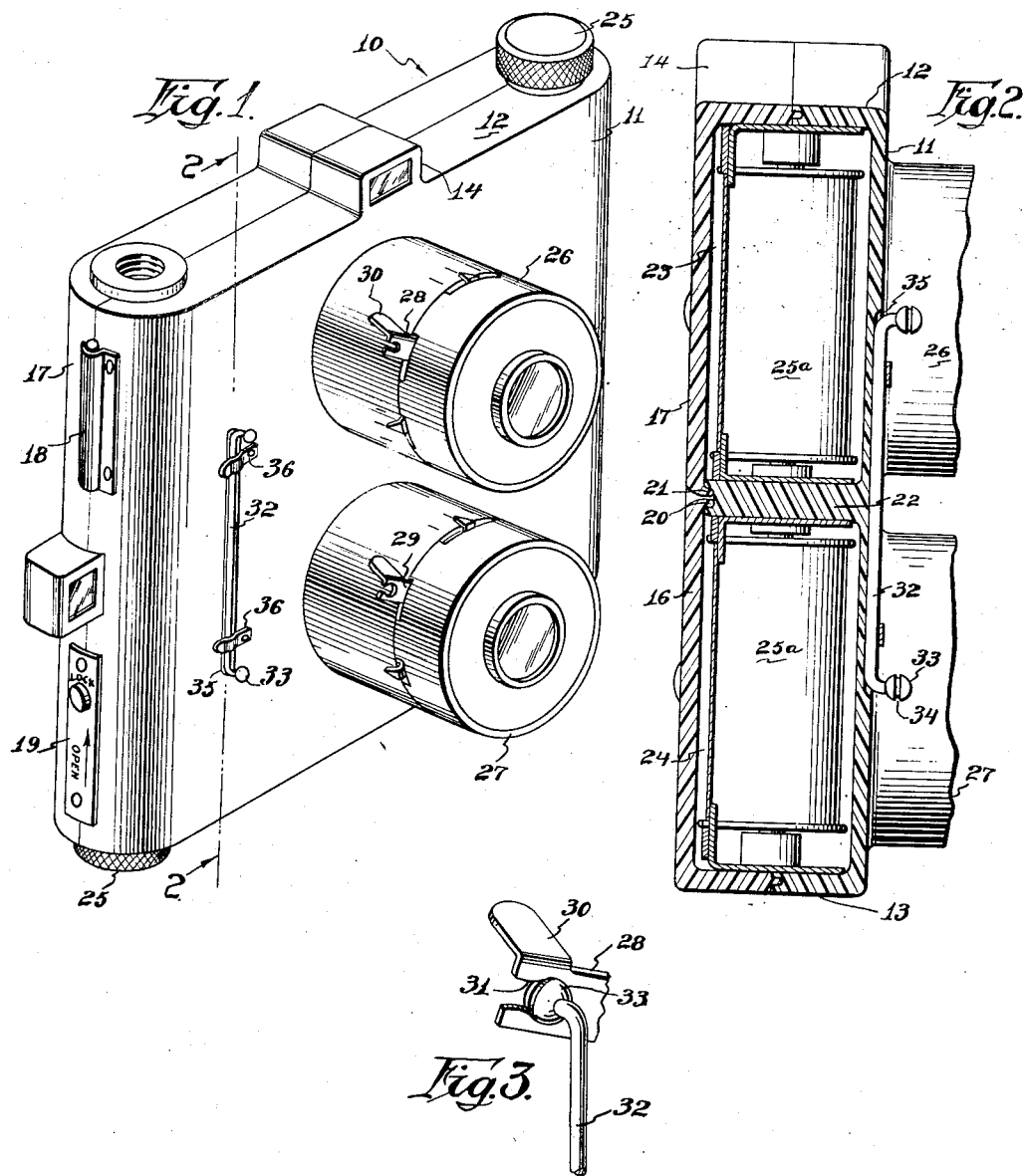
INVENTOR.
Frederick L. O. Roehrig,
BY
Wilfred Lawson
Attorney.

Patented Jan. 19, 1954

2,666,374

UNITED STATES PATENT OFFICE 2,666,374

DUAL CAMERA

Frederick L. O. Roehrig, Yucaipa, Calif.

Application January 10, 1951, Serial No. 205,239

4 Claims. (Cl. 95—18)

1

This invention relates to photographic apparatus and more particularly to a camera having two films which may be exposed separately or simultaneously. The general purpose and objective of the invention is to provide a novel camera construction having two films and two objective lenses provided with shutter actuating means whereby the shutters may be actuated together or either shutter may be actuated separately. A more particular object of the invention is to provide a dual camera having two lenses with novel shutter actuating means whereby the shutters may be jointly or separately actuated.

An additonal object of the invention is to provide a novel actuating link for the shutters of the two lenses of a dual camera whereby these shutters may be jointly or separately actuated.

Other objects and advantages will appear and be brought out more fully in the following specification, reference being had to the accompanying drawing;

In the drawing:

Figure 1 is a perspective view of a dual camera embodying the present invention;

Figure 2 is a sectional view taken along the line 2—2 of Figure 1;

Figure 3 is a fragmentary perspective view showing the shutter actuating link features of the invention.

Referring to the drawing in detail, this invention comprises a camera having a front wall 11, top and bottom walls 12, which may if desired be provided with sights 14 and 15. The camera includes a pair of rear walls 16 and 17, each having a hinge connection 18 to the front wall 11 and a latch or lock connection 19 to the front wall. Rear walls 16 and 17 have upper and lower side wall connection to corresponding walls 12 and 13 of front wall 11 and have flanges 20 which interfit in a groove 21 in an intermediate wall 22 which extends rearwardly of front wall 11 forming film exposing compartments 23 and 24. A film winding spindle having a winding knob 25 is provided for each compartment for winding a film 25a therein.

A pair of lenses 26 and 27 are secured on front wall 11 and optically aligned for exposure of the films in chambers or compartments 23 and 24 and the lenses are provided with operating shutter levers 28 and 29. These levers are similar and each has a flanged thumb or finger piece formed with a slot 31, the inner end of which may be enlarged if desired. A link 32 has offset bent end portions formed as or provided with a

2 ball 33 which has a peripheral groove 34 which is adapted to engage in slots 31 of shutter levers 28 and 29. A front wall 11 is provided with a groove 35 in which link 32 may be positioned when not in use and a pair of spring clips 36 are mounted on wall 11 across groove 35 for holding the link in position in the groove. An intermediate wall 22 is integrally connected to front wall 11 and thus forms two film exposure compartments which are light tight and no light leakage from one compartment to the other will result.

In the operation of the invention link 32 may be connected to both shutter actuating levers 28 and 29 as illustrated in Figure 3 and when it is desired to make a film shot exposing both films in compartments 23 and 24 this may be accomplished by the actuation of either shutter lever 28 or 29 and the link 32, which is connected to the other shutter lever will cause actuation of this shutter lever also. Whenever it is desired to make a single shot of the film in either of the film compartments link 32 may be disconnected from the shutter levers and the two portions of the camera may be used separately.

While in the foregoing there has been shown and described the preferred form of this invention, it is to be understood that minor changes in the details of construction, combination and arrangement of parts may be resorted to without departing from the spirit and scope of the invention as claimed.

I claim:

1. In a dual film camera, a film housing having a division wall forming two film compartments, a pair of objective lenses each provided with a shutter actuating lever, each lens opening into a compartment, a link adapted to be detachably connected to said levers whereby said levers may be actuated simultaneously, said levers each having a slot and said link having an enlarged portion on each end formed with a groove for interfitting frictional engagement and retention in one of said shutter lever slots.

2. In a dual film camera, a film housing having a division wall forming two film compartments, a pair of objective lenses each provided with a shutter actuating lever, each lens opening into a compartment, a link adapted to be detachably connected to said levers whereby said levers may be actuated simultaneously, said levers each having a slot and said link having a ball on each end formed with a groove for interfitting frictional engagement and retention in one of said shutter lever slots.

3. In a dual film camera, a film housing having a division wall forming two film compartments, a pair of objective lenses each provided with a shutter actuating lever, each lens opening into a compartment, a link adapted to be detachably connected to said levers whereby said levers may be actuated simultaneously, said levers each having a slot and said link having a ball on each end and formed with a groove for interfitting frictional engagement in one of said shutter lever slots, the lever having a portion of each end directed laterally and positioning the ball thereon offset from the center line of said link.

4. In a dual film camera, a film housing having two film compartments and a front wall common to said compartments, a pair of objective lens units carried by and extending forwardly from said wall, each unit opening into a compartment and carrying a laterally extending shutter actuating lever, said levers each being in a position relative to said front wall of ready accessibility for selective finger actuation, each lever having a slot therein opening through the outer end thereof, and a coupling link between said levers and having a portion of each end adapted for insertion in a lever slot and provided with a groove for receiving opposite edges of the slot, the grooved ends of the link being frictionally held in the slots for quick attachment to and detachment from the levers to facilitate either independent actuation of the levers or simultaneous actuation thereof.

FREDERICK L. O. ROEHRIG.

References Cited in the file of this patent

UNITED STATES PATENTS

| Number | Name | Date |
|---|---|---|
| 1,813,428 | Seitz | July 7, 1931 |
| 2,042,983 | Fairchild | June 2, 1936 |
| 2,458,466 | Campbell | Jan. 4, 1949 |
| 2,478,301 | Mourfield | Aug. 9, 1949 |